US009058183B2

(12) United States Patent
Woller et al.

(10) Patent No.: US 9,058,183 B2
(45) Date of Patent: Jun. 16, 2015

(54) HYPERVISOR ISOLATION OF PROCESSOR CORES TO ENABLE COMPUTING ACCELERATOR CORES

(75) Inventors: Thomas R. Woller, Austin, TX (US); Patryk Kaminski, Austin, TX (US); Erich Boleyn, Portland, OR (US); Keith A. Lowery, Bothell, WA (US); Benjamin C. Serebrin, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1047 days.

(21) Appl. No.: 12/648,592

(22) Filed: Dec. 29, 2009

(65) Prior Publication Data

US 2011/0161955 A1 Jun. 30, 2011

(51) Int. Cl.
*G06F 9/44* (2006.01)
*G06F 9/455* (2006.01)
*G06F 9/50* (2006.01)

(52) U.S. Cl.
CPC .......... *G06F 9/4406* (2013.01); *G06F 9/45545* (2013.01); *G06F 9/5083* (2013.01); *G06F 2009/45579* (2013.01); *G06F 2209/509* (2013.01)

(58) Field of Classification Search
None
See application file for complete search history.

(56) References Cited

U.S. PATENT DOCUMENTS

| | | | |
|---|---|---|---|
| 7,809,895 B2 * | 10/2010 | Spracklen et al. ............ | 711/151 |
| 8,510,859 B2 | 8/2013 | Zimmer et al. | |
| 8,713,574 B2 * | 4/2014 | Creamer et al. .............. | 718/104 |
| 2003/0229794 A1 | 12/2003 | Sutton, II et al. | |
| 2006/0150183 A1 | 7/2006 | Chinya et al. | |
| 2008/0271014 A1 | 10/2008 | Serebrin et al. | |
| 2009/0007104 A1 | 1/2009 | Zimmer et al. | |
| 2009/0037936 A1 | 2/2009 | Serebrin et al. | |
| 2009/0055693 A1 | 2/2009 | Budko et al. | |
| 2009/0187697 A1 | 7/2009 | Serebrin | |
| 2009/0187698 A1 | 7/2009 | Serebrin | |
| 2009/0187726 A1 | 7/2009 | Serebrin et al. | |
| 2009/0187729 A1 | 7/2009 | Serebrin et al. | |
| 2009/0187902 A1 | 7/2009 | Serebrin | |
| 2009/0187904 A1 | 7/2009 | Serebrin et al. | |
| 2010/0325644 A1 * | 12/2010 | van der Linden et al. .... | 719/327 |
| 2011/0010721 A1 * | 1/2011 | Gupta et al. ................... | 718/103 |

OTHER PUBLICATIONS

AMD, "AMD-V™ Nested Paging" White Paper, Revision 1.0, Jul. 2008, 19 pages.

(Continued)

*Primary Examiner* — Eric C Wai
(74) *Attorney, Agent, or Firm* — Abel Law Group, LLP

(57) ABSTRACT

Techniques for utilizing processor cores include sequestering processor cores for use independently from an operating system. In at least one embodiment of the invention, a method includes executing an operating system on a first subset of cores including one or more cores of a plurality of cores of a computer system. The operating system executes as a guest under control of a virtual machine monitor. The method includes executing work for an application on a second subset of cores including one or more cores of the plurality of cores. The first and second subsets of cores are mutually exclusive and the second subset of cores is not visible to the operating system. In at least one embodiment, the method includes sequestering the second subset of cores from the operating system.

21 Claims, 9 Drawing Sheets

(56) References Cited

OTHER PUBLICATIONS

AMD, "AMD Virtualization (AMD-V™) Technology," data sheet, downloaded Aug. 26, 2009, URL: <http://www.amd.com/us/products/technologies/virtualization/Pages/amd-v.aspx, 2 pages.

AMD, "The Future is Fusion: The Industry-Changing Impact of Accelerated Computing," White Paper, 2008, 10 pages.

Govil, Kinshuk, et al., "Cellular Disco: Resource Management Using Virtual Clusters on Shared-Memory Multiprocessors," 17th ACM Symposium on Operating Systems Principles (SOSP'99), Operating Systems Review 33(5):154-169, Dec. 1999.

Jeffery, Casey M., and Figueiredo, Renato J. O., "Towards Byzantine Fault Tolerance in Many-core Computing Platforms," 13th IEEE International Symposium on Pacific Rim Dependable Computing, PRDC 2007, Dec. 17-19, 2007, pp. 256-259.

International Search Report and Written Opinion mailed Aug. 22, 2011 in PCT App. No. PCT/US2010/060193, 11 pages.

* cited by examiner

HYPERVISOR ISOLATION OF PROCESSOR CORES TO ENABLE COMPUTING ACCELERATOR CORES

BACKGROUND

1. Field of the Invention

The invention is related to computer systems and more particularly to multi-core computer systems.

2. Description of the Related Art

In general, the number of central processing unit (CPU) cores (i.e., processor cores) and/or processors included within a computing system is increasing rapidly. Referring to FIG. 1, an exemplary computing system 100 includes multiple processors 102, each of which includes one or more processor cores (e.g., processor cores 104). Processors 102 are coupled to other processors 102, memory 106, devices 108, and storage 110 by one or more hub integrated circuits (e.g., memory controller hub and I/O controller hub), bus (e.g., PCI bus, ISA bus, and SMBus), other suitable communication interfaces, or combinations thereof. An operating system (e.g., Microsoft Windows, Linux, and UNIX) provides an interface between the hardware and a user (i.e., computing applications, e.g., applications 114). Execution of operating system 112 may be distributed across a plurality of cores 104.

Although a computing system includes multiple processor cores, a typical computing system may not be able to utilize all processor cores or utilize all processor cores efficiently. For example, an operating system may be able to access and control only a limited number of CPU cores, leaving idle other cores in the computing system.

SUMMARY OF EMBODIMENTS OF THE INVENTION

Accordingly, techniques for utilizing processor cores include sequestering processor cores for use independently from an operating system. In at least one embodiment of the invention, a method includes executing an operating system on a first subset of cores including one or more cores of a plurality of cores of a computer system. The operating system executes as a guest under control of a virtual machine monitor. The method includes executing work for an application on a second subset of cores including one or more cores of the plurality of cores. The first and second subsets of cores are mutually exclusive and the second subset of cores is not visible to the operating system. In at least one embodiment, the method includes sequestering the second subset of cores from the operating system.

In at least one embodiment of the invention, an apparatus includes a plurality of cores and an operating system software encoded in one or more media accessible to the plurality of cores. The apparatus includes hypervisor software encoded in one or more media accessible to the plurality of cores and executable on one or more of the plurality of cores. The hypervisor software is executable to control execution of the operating system software as a guest on a first set of cores including one or more cores of the plurality of cores and to execute at least some work of an application on a second set of cores including one or more cores of the plurality of cores. The second set of cores is not visible to the operating system.

In at least one embodiment of the invention, a computer program product includes one or more functional sequences executable as, or in conjunction with, a virtual machine monitor and configured to execute an operating system sequence as a guest under control of the virtual machine monitor on a first set of cores including one or more cores of a plurality of cores. The computer program product includes one or more functional sequences to execute at least some work of an application on a second set of cores including one or more cores of the plurality of cores. The second set of cores is not visible to the operating system.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
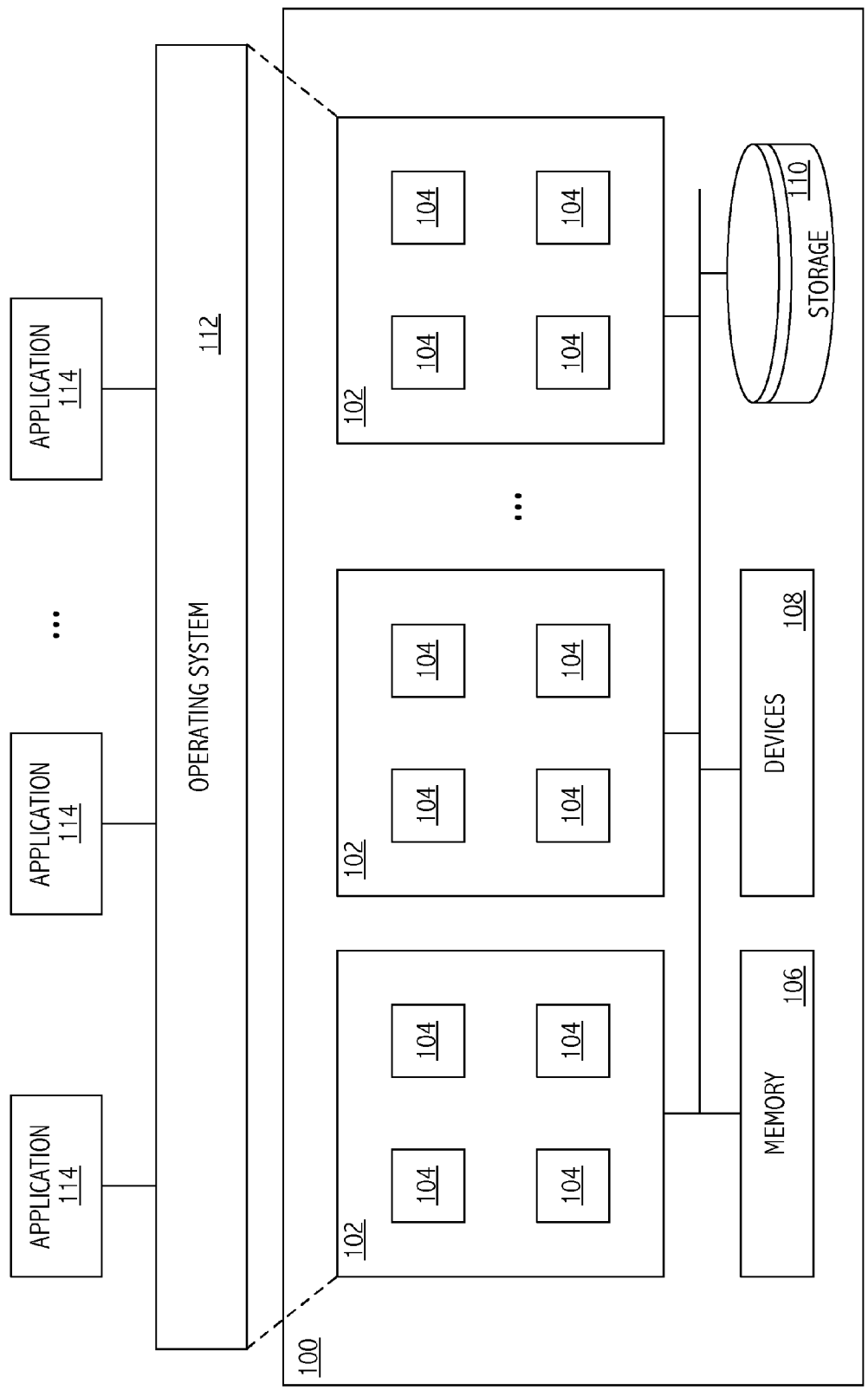
FIG. 1 illustrates a functional block diagram of an exemplary multi-core computing system.
Figure 2:
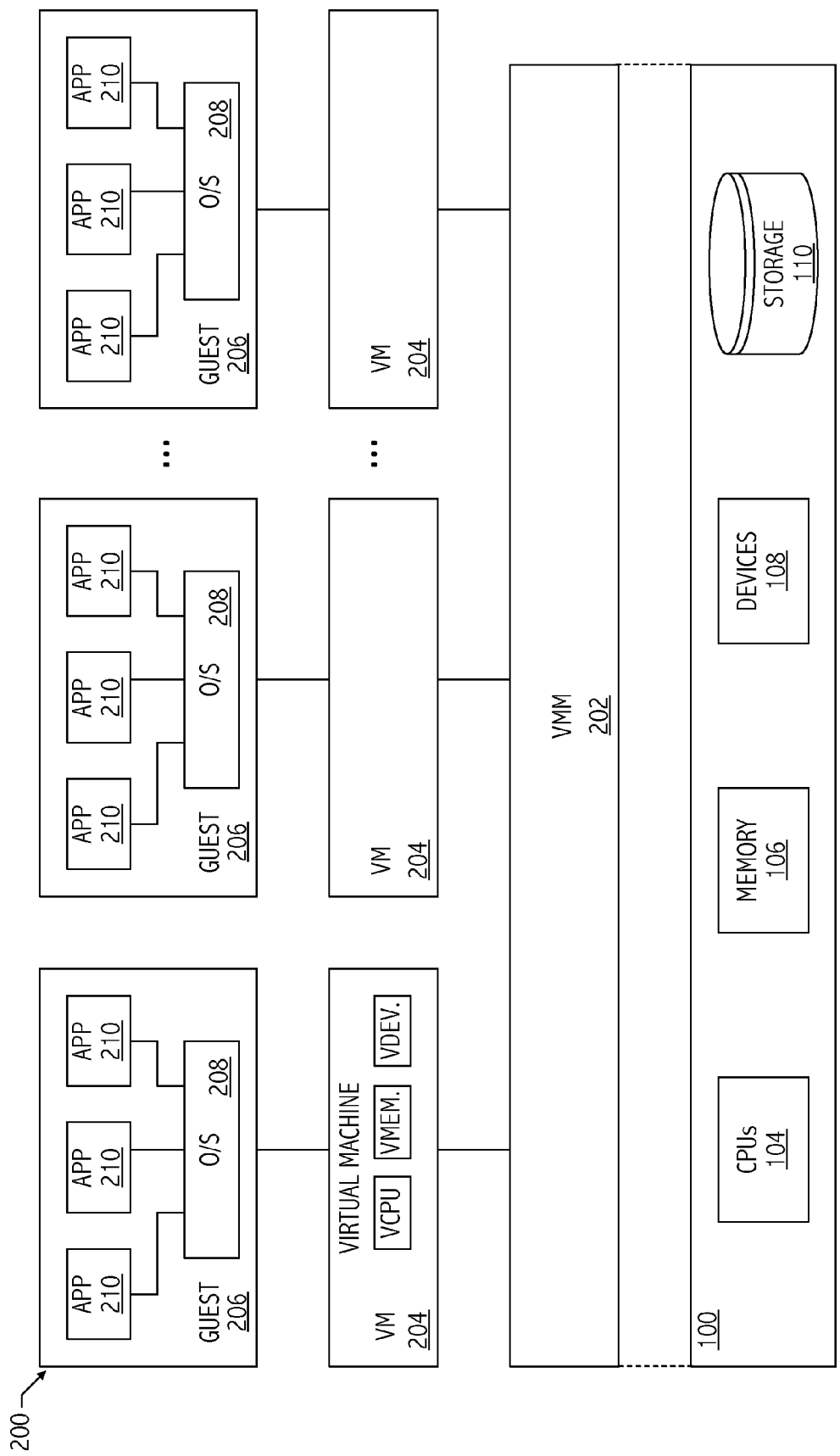
FIG. 2 illustrates a functional block diagram of an exemplary virtualization system.

Referring to FIG. 2, virtualization of a computing system is used to hide physical characteristics of the computing system from a user (i.e., software executing on the computing system) and instead, presents an abstract emulated computing system (i.e., a virtual machine (VM)) to the user. Physical hardware resources of computing system 100 are exposed to one or more guests (e.g., guests 206) as one or more corresponding isolated, apparently independent, virtual machines (e.g., VM 204). For example, a virtual machine may include one or more virtual resources (e.g., VCPU, VMEMORY, and VDEVICES) that are implemented by physical resources of computing system 100 that a virtual machine monitor (VMM) (i.e., hypervisor, e.g., VMM 202) allocates to the virtual machine.

As referred to herein, a "virtual machine monitor" (VMM) or "hypervisor" is software that provides the virtualization capability. The VMM provides an interface between the guest software and the physical resources. Typically, the VMM provides each guest the appearance of full control over a complete computer system (i.e., memory, central processing unit (CPU) and all peripheral devices). A Type 1 (i.e., native) VMM is a standalone software program that executes on physical resources and provides the virtualization for one or more guests. A guest operating system executes on a level above the VMM. A Type 2 (i.e., hosted) VMM is integrated into or executes on an operating system, the operating system components execute directly on physical resources and are not virtualized by the VMM. The VMM is considered a distinct software layer and a guest operating system may execute on a third software level above the hardware. Although the description that follows refers to an exemplary Type 1 VMM, techniques described herein may be implemented in a Type 2 VMM.

Referring back to FIG. 2, while VM 204 has full control over the virtual resources of virtual machine 204, VMM 202 retains control over the physical resources. A guest system, e.g., an instance of an operating system (e.g., Windows, Linux, and UNIX) executes on a corresponding virtual machine and shares physical resources with other guest systems executing on other virtual machines. Thus, multiple operating systems (e.g., multiple instances of the same operating system or instances of different operating systems) can co-exist on the same computing system, but in isolation from each other.

VMM 202 is executed by some or all processor cores in the physical resources. An individual guest is executed by a set of processor cores included in the physical resources. The processors switch between execution of VMM 202 and execution of one or more guests 206. As referred to herein, a "world switch" is a switch between execution of a guest and execution of a VMM. In general, a world switch may be initiated by a VMMCALL instruction or by other suitable techniques, e.g., interrupt mechanisms or predetermined instructions defined by a control block, described below. Although a particular world switch may be described herein as being initiated using a particular technique, other suitable techniques may be used. During a world switch, a current processor core environment (e.g., guest or VMM) saves its state information and restores state information for a target core environment (e.g., VMM or guest) to which the processor core execution is switched. For example, a VMM executes a world switch when the VMM executes a guest that was scheduled for execution. Similarly, a world switch from executing a guest to executing a VMM is made when the VMM exercises control over physical resources, e.g., when the guest attempts to access a peripheral device, when a new page of memory is to be allocated to the guest, or when it is time for the VMM to schedule another guest, etc.

Virtualization techniques may be implemented using only software (which includes firmware) or by a combination of software and hardware. For example, some processors include virtualization hardware, which allows simplification of VMM code and improves system performance for full virtualization (e.g., hardware extensions for virtualization provided by AMD-V and Intel VT-x). Software, as described herein, may be encoded in at least one computer readable medium selected from the set of a disk, tape, or other magnetic, optical, or electronic storage medium.

Virtualization techniques may be used to isolate or sequester one or more processor cores of a computing system from an operating system executing as a guest on one or more other processing cores of the computer system under control of a VMM. In at least one embodiment of a virtualization system, sequestered cores may be configured as de facto accelerators. That is, sequestered cores are used by the VMM to complete work initiated from within the operating system environment. Although the host cores and the sequestered cores reside within a shared memory environment, the sequestered cores are not managed by the operating system directly. The VMM is configured as a vehicle for communicating between the sequestered cores and the host cores. An exemplary VMM implements a memory-based solution for propagating work requests, page faults, and completion information using a queue-based architecture implemented within a shared memory space. Computational work may be initiated within the confines of the guest operating system. A VMM then coordinates work between the operating system and the sequestered cores. Accordingly, a VMM may be used to implement general computational acceleration. A VMM and sequestered cores may be used to implement instant-on application usage. In addition, a VMM may be used to configure sequestered cores as network device accelerators.

The number of cores used by a guest operating system (i.e., host cores) may be selectable. For example, the number of host cores may be the maximum number of cores that a particular guest operating system is able to utilize. However, in at least one embodiment of a virtualization system, the number of cores used by the guest operating system is not limited thereto, and a system may be configured with a predetermined number of cores for an operating system that is less than a maximum number of cores.

Figure 3:
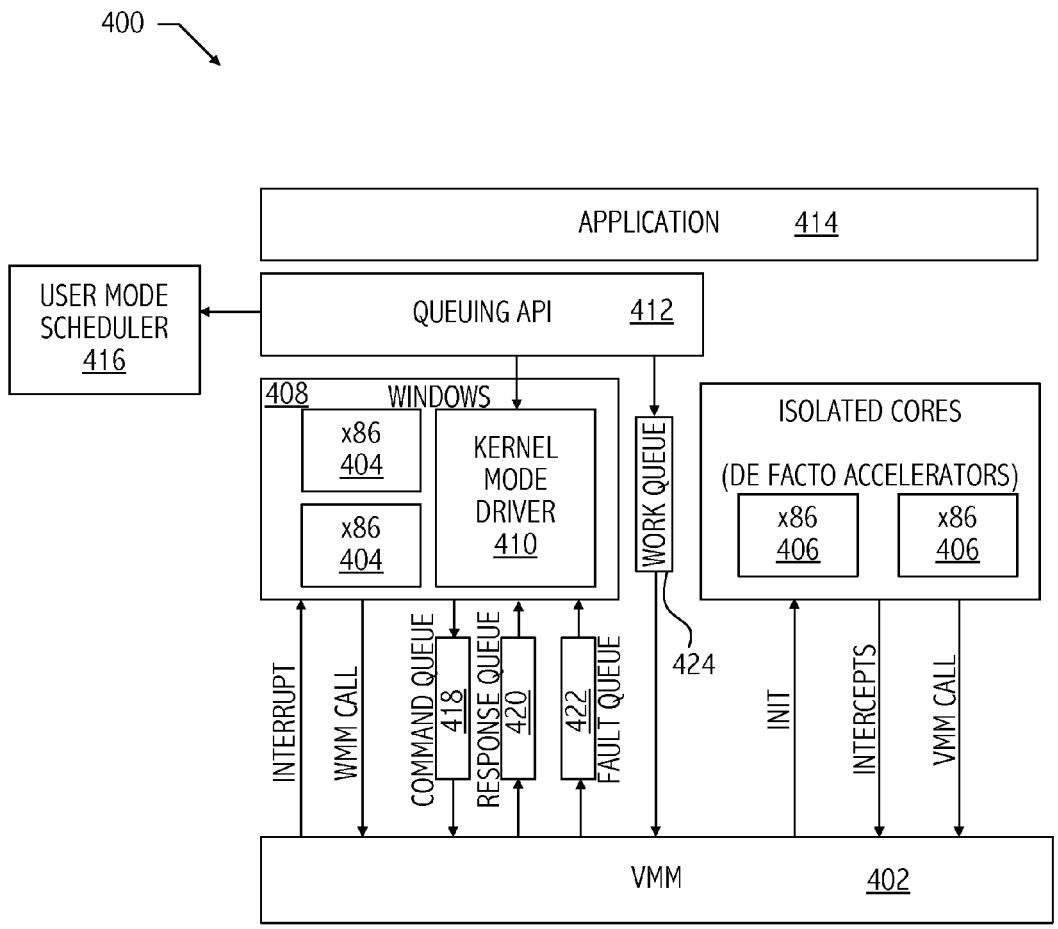
FIG. 3 illustrates a functional block diagram of an exemplary virtualization system consistent with at least one embodiment of the invention.

Referring to FIG. 3, exemplary computing system 400 includes VMM 402. VMM 402 emulates a decoupled architecture, i.e., VMM 402 sequesters cores to execute applications or application tasks. In at least one embodiment, VMM 402 sequesters cores 406 from cores 404. In at least one embodiment, VMM 402 assigns host cores 404 and sequestered cores 406 separate virtual memory spaces. In at least one embodiment, VMM 402 assigns host cores 404 and sequestered cores 406 a shared virtual memory space. Techniques for implementing a shared virtual memory space are described in U.S. patent application Ser. No. 12/648,550, entitled "SYSTEMS AND METHODS IMPLEMENTING NON-SHARED PAGE TABLES FOR SHARING MEMORY RESOURCES MANAGED BY A MAIN OPERATING SYSTEM WITH ACCELERATOR DEVICES," naming Patryk Kaminski, Thomas Woller, Keith Lowery, and Erich Boleyn, as inventors, now U.S. Pat. No. 8,719,543, issued May 6, 2014, and U.S. patent application Ser. No. 12/648,556, entitled "SYSTEMS AND METHODS IMPLEMENTING SHARED PAGE TABLES FOR SHARING MEMORY RESOURCES MANAGED BY A MAIN OPERATING SYSTEM WITH ACCELERATOR DEVICES," naming Patryk Kaminski, Thomas Woller, Keith Lowery, and Erich Boleyn, as inventors, both filed on or about the filing date of the instant application, which applications are hereby incorporated by reference herein.

In at least one embodiment, VMM 402 maintains a set of control blocks, which include state and control information for execution of a guest on host cores 404 and a set of state and control information for execution of a work unit on sequestered cores 406. In at least one embodiment, these control blocks are known as virtual machine control blocks (VMCBs). Each guest and de facto accelerator may be associated with a corresponding control block. Exemplary control blocks may be stored in memory and/or in storage of the host hardware and include state and control information for a corresponding guest or de facto accelerator and/or state and control information for the VMM. For example, a control block includes state information corresponding to core state at a point at which a guest last exited. Exemplary control blocks may be accessed by particular instructions and information may be stored in particular fields of predetermined data structures.

In at least one embodiment of computing system 400, VMM 402 is configured to isolate at least one core (e.g., sequestered cores 406) for use as a de facto accelerator. Operating system 408 (e.g., Microsoft Windows) executes as a guest on host cores 404 (e.g., x86 cores) and application 414 executes on operating system 408. Kernel mode driver 410, which executes on operating system 408, exchanges information with VMM 402 to provide user application 414 indirect access to the de facto accelerators. The guest operating system may utilize sequestered cores 406 using kernel mode driver 410, e.g., using a call. Communications between VMM 402 and guest operating system 408 and between VMM 402 and de facto accelerators are accomplished using queues in shared virtual memory (e.g., work queue 424, command queue 418, fault queue 422, and response queue 420).

Scheduler 416 includes a thread pool across which work items are distributed to available segregated cores 406. In at least one embodiment of scheduler 416, the work units are assigned to available segregated cores using round-robin scheduling; however, other suitable scheduling algorithms (e.g., dynamic priority scheduling, etc.) may be used in other embodiments of scheduler 416. In at least one embodiment of computing system 400, scheduler 416 is a user-mode scheduler, which allows scheduling to be performed separate from the operating system. However, in at least one embodiment of computing system 400, scheduler 416 is a kernel-mode scheduler, which requires modification of kernel-level portions of the operating system. In at least one embodiment of computing system 400, at least some of the functionality of scheduler 416 is performed by VMM 402 and/or at least some of the functionality of scheduler 416 is performed by kernel mode driver 410. VMM 402 maintains relevant topology and architecture information in an information or control structure that is visible to kernel mode driver 410. VMM 402 provides at least information about available de facto accelerators to kernel mode driver 410.

In at least one embodiment of computing system 400, a fault queue 422, command queue 418, response queue 420, and work queue 424 are implemented in shared virtual memory space. All of those queues require operating system access (e.g., kernel mode access). In at least one embodiment of computing system 400, the queues must be accessible from outside of the process context of a creating application. Thus, operating system 408 must provide memory translation. Only the work queue requires user-mode access. In at least one embodiment, queues, 418, 420, 422, and 424 use non-locking implementations and are configured for a single reader and a single writer. Virtual machine monitor 402 enqueues to fault queue 422 and response queue 420. Kernel mode driver 410 dequeues from fault queue 422 and response queue 420. Kernel mode driver 410 enqueues to command queue 418 and VMM 402 dequeues from command queue 418. Application 414 enqueues to work queue 424. Scheduler 416, which may be implemented using VMM 402 and/or kernel mode driver 410, dequeues from work queue 424.

In at least one embodiment of computing system 400, application 414 calls queueing application programming interface (API) 412 to initialize the queueing interfaces. Queueing API 412 instantiates kernel mode driver 410 and makes documented input/output control (ioctl) calls to allocate the queues. Kernel mode driver 410 receives the ioctl command and allocates queues that may be read or written by appropriate entities (e.g., VMM 402 and kernel mode driver 410), consistent with the description above. Kernel mode driver 410 creates an internal work table that associates work queue 424 with an address space. Kernel mode driver 410 also creates a page table and allocates stacks for the de facto accelerators. Kernel mode driver 410 creates a kernel mode thread and also returns a pointer to work queue 424 for use by application 414.

In at least one embodiment of computing system 400, polling techniques are used to process the queues. In at least one embodiment of computing system 400, rather than using polling techniques, communications between VMM 402 and guest operating system 408 and between VMM 402 and sequestered cores 406, configured as de facto accelerators, are achieved using doorbell techniques. In general, any writer (e.g., kernel mode driver 410, queuing API 412, or VMM 402) to a queue will ring a doorbell to notify a recipient (e.g., kernel mode driver 410 or VMM 402) of available queue items. In at least one embodiment of the computing system, VMM 402 supports a VMM call that serves as a doorbell for a specific queue. Information that indicates which queue contains a new entry, and/or other suitable information, is included in the parameters of the VMM call. In addition, VMM 402 rings the doorbell of kernel mode driver 410 by issuing a software interrupt. Different software interrupts may be used to distinguish between different doorbell recipients.

For example, application 414 may push an entry into work queue 424 via queueing API 412 and kernel mode driver 410 rings a doorbell for VMM 402, e.g., by executing a VMMCALL, to indicate that the work queue has a new entry. The VMMCALL instruction transfers control from guest operating system 408 to VMM 402. Similarly, when kernel mode driver 410 pushes a command into command queue 418, kernel mode driver 410 rings a doorbell (e.g., by executing a VMMCALL) for VMM 402 to indicate that the command queue has a new entry. In yet another example, when a work unit has completed on a sequestered core 406 configured as a de facto accelerator, VMM 402 may push an entry into fault queue 422 and send a fault queue interrupt via a local Advanced Programmable Interrupt Controller (APIC) to a host core 404. VMM 402 can ring the doorbell of kernel mode driver 410 using software interrupts. The particular interrupt number used is stored in a field in a configuration block and maintained by kernel mode driver 410.

Application 414 creates work queue 424 and registers with kernel mode driver 410 for an entry point in the work queue table. Application 414 uses queuing API 412 to add work items to work queue 424. Queuing API 412 rings the doorbell of scheduler 416. In embodiments where scheduling logic resides in kernel mode driver 410, kernel mode driver 410 will read work queue 424. Accordingly, calls to VMM 402 will explicitly include an indicator of which core should be targeted by VMM 402. In response to the doorbell, scheduler 416 determines whether a de facto accelerator is available. If no de facto accelerator is available, scheduler 416 updates a status to indicate that work queue 424 is not empty. If a de facto accelerator is available, scheduler 416 reads work queue 424. Scheduler 416 selects an available de facto accelerator and makes a scheduling call to VMM 402.

In at least one embodiment of computing system 400, when scheduler 416 is distinct from VMM 402, scheduler 416 may write a command to command queue 418 and ring the doorbell of VMM 402. Then VMM 402 sets up execution context and initializes a target sequestered core 406 configured as a de facto accelerator. VMM 402 writes to response queue 420 and scheduler 416 processes response queue 420 to maintain visibility into status (e.g., availability) of sequestered cores 406. When scheduler 416 dequeues a work item from work queue 424, scheduler 416 consults a list of available de facto accelerators of sequestered core 406 configured as de facto accelerators and selects a target sequestered core 406. Scheduler 416 then creates and enqueues a command queue entry that indicates the work item and the target sequestered core 406. Then scheduler 416 rings the doorbell of VMM 402. In order for scheduler 416 to maintain an accurate view of resource availability, scheduler 416 should be notified of work item completion. In at least one embodiment of computing system 400, a system stack is manipulated so that a return from a work item makes a VMM call to notify VMM 402 of work item completion.

Figure 4:
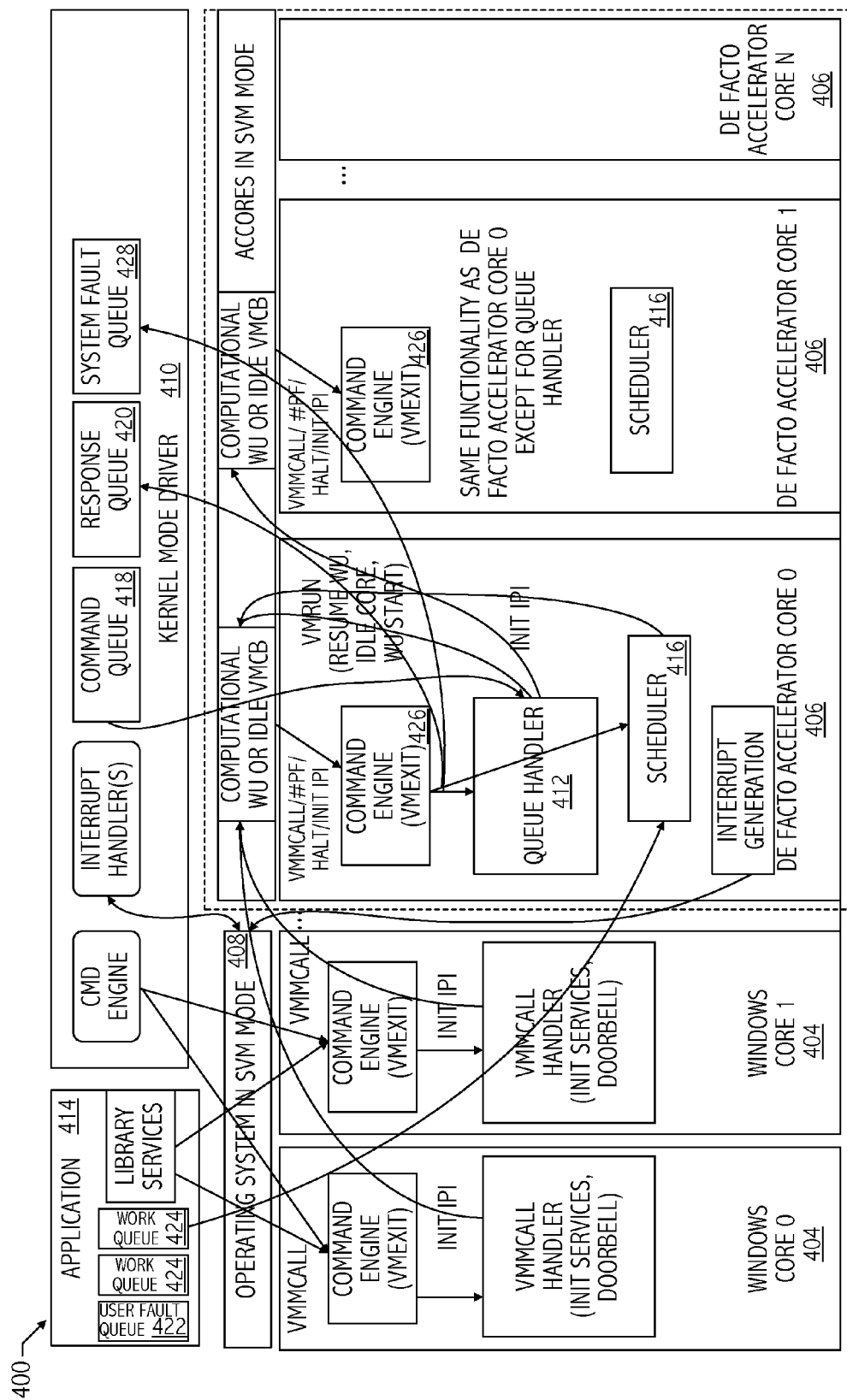
FIG. 4 illustrates a functional block diagram of an exemplary virtual machine monitor executing on the virtualization system of FIG. 3 with sequestered processor cores configured as de facto accelerators consistent with at least one embodiment of the invention.
Figure 5:
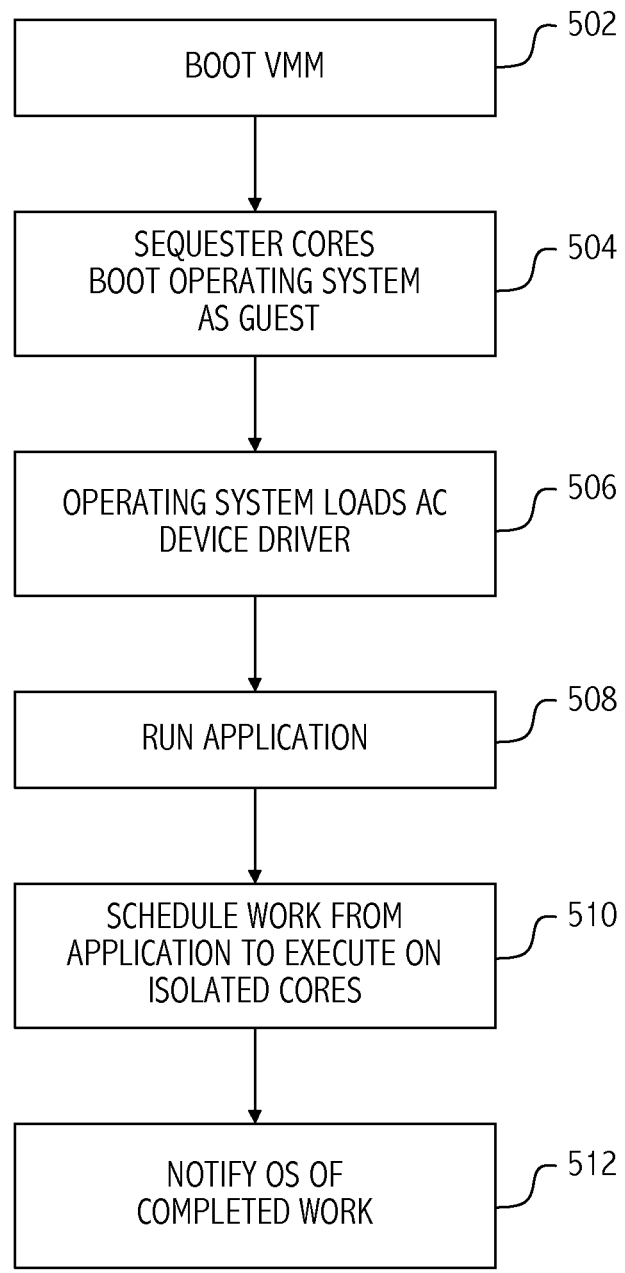
FIG. 5 illustrates exemplary information and control flows in the virtualization system of FIG. 3 with sequestered processor cores configured as de facto accelerators consistent with at least one embodiment of the invention.

Referring to FIGS. 3, 4, and 5, upon a system reset, VMM 402 boots on the cores of system 400 (e.g., host cores 404 and sequestered cores 406) (502). In at least one embodiment, VMM 402 is booted from memory (e.g., on a hard drive), separately from the Basic Input Output System. Virtual machine monitor 402 then boots operating system 408 as a guest on operating system cores 404 and sequesters cores 406 from cores 402 (504). For example, when booting operating system 408, VMM 402 informs operating system 408 of a number of cores on which to execute. Then operating system 408 will not attempt to access sequestered cores 406. Other techniques for sequestering cores 406 from operating system cores 404 include modifying the BIOS tables so that operating system 408 is aware of only a particular number of cores less than a total number of cores, with virtual machine monitor 402 controlling the environments on both sets of cores. Those BIOS tables may either be loaded automatically from read-only memory or patched in by VMM 402. In another technique for sequestering cores from the operating system, VMM 402 intercepts operating system commands to configure a number of operating system cores.

After the cores are sequestered and the operating system has booted, operating system 408 loads an accelerated computing kernel mode device driver 410 (508). Application 414 runs on operating system 408 (510). Application 414 generates work units, which are then scheduled to execute on sequestered cores 406 (512). Upon completion, VMM 402 notifies operating system 408 of completed work (514).

Figure 6:
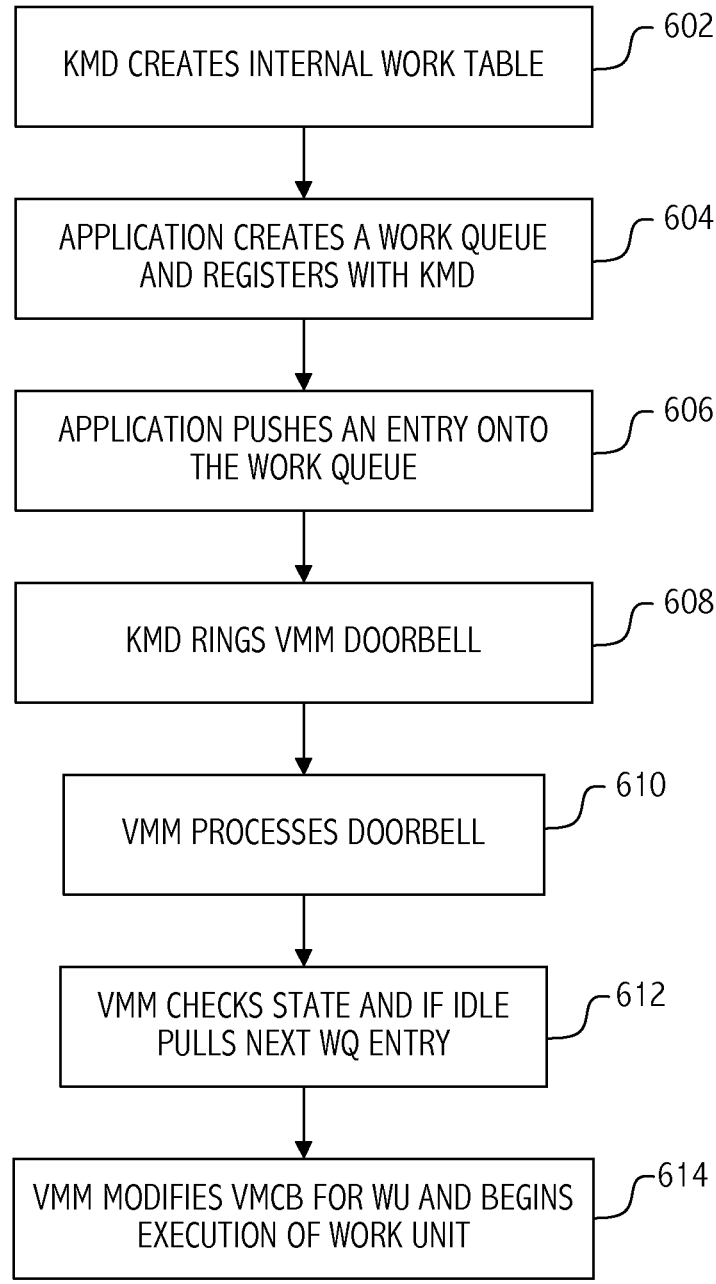
FIG. 6 illustrates exemplary information and control flows for a work unit process flow in the virtualization system of FIG. 3 with sequestered processor cores configured as de facto accelerators consistent with at least one embodiment of the invention.

Referring to FIGS. 3, 4, and 6, a work unit initiation process is described in additional detail. In at least one embodiment of computing system 400, kernel mode driver 410 creates an internal work table, which may be used for adding work queue table entries (602). Application 414 creates a work queue and registers with kernel mode driver 410 for an entry in the work queue table (604). While executing, application 414 pushes a work queue entry onto work queue 424 (606). Kernel mode driver 410 notifies VMM 402 that work queue 424 has a new entry (608) using a doorbell (e.g., VMMCALL), as described above, or other suitable notification technique. Virtual memory monitor 402 processes the doorbell on host cores 404 and sends an INIT inter-processor interrupt (IPI) to a particular sequestered core 406. Virtual machine monitor 402 processes an exit to VMM 402 on the particular sequestered core 406 (610). If the particular sequestered core 406 is idle (i.e., is not already processing a work unit), VMM 402 pulls a next work unit entry from work queue 424 (612), modifies a VMCB, and begins execution of code for processing the work unit (614). Otherwise, the particular sequestered core continues executing a previously launched work unit. In at least one embodiment of computing system 400, if a particular sequestered core 406 is already executing a work unit, VMM 402 will not interrupt that particular sequestered core 406 with an exit to VMM 402.

Figure 7:
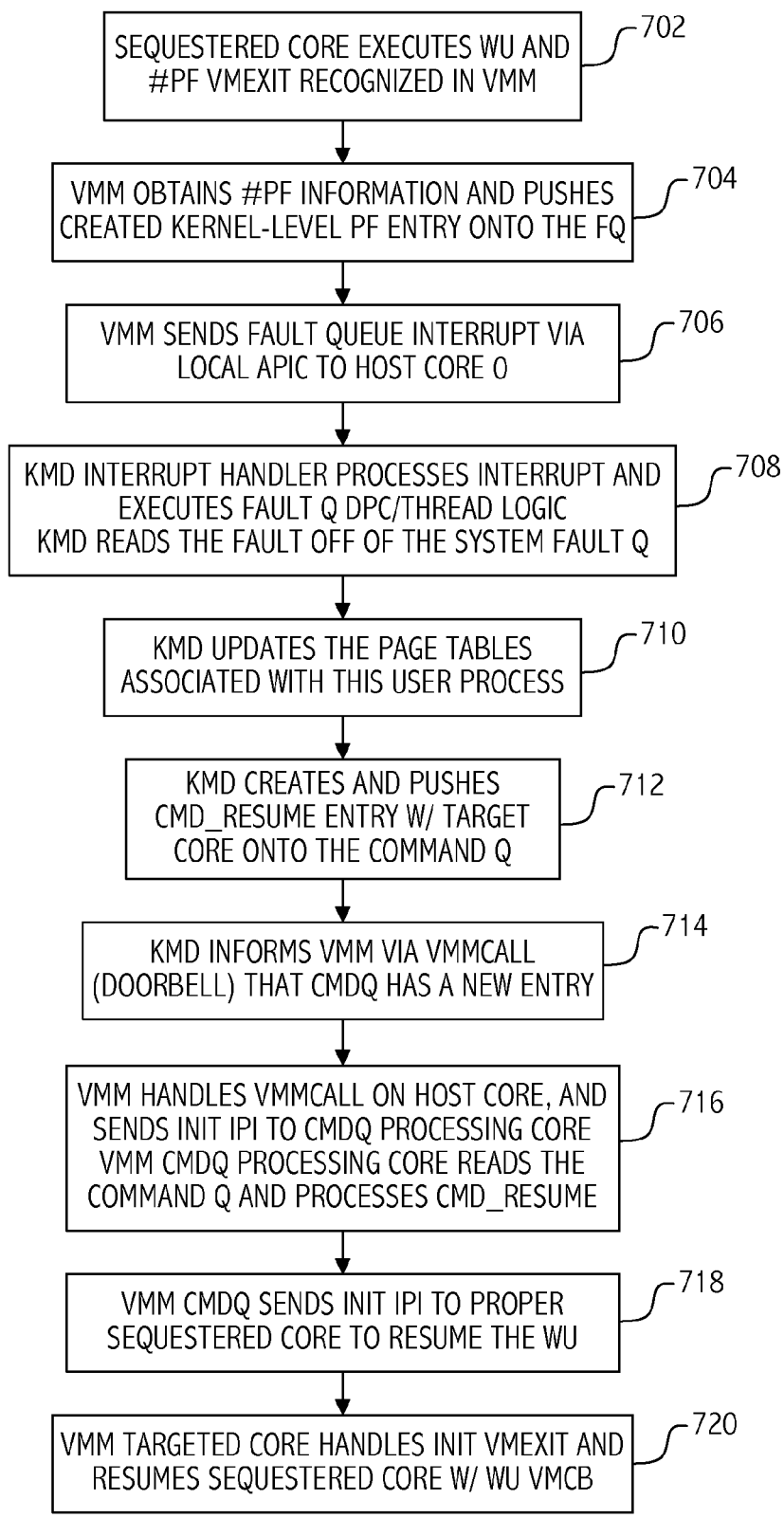
FIG. 7 illustrates exemplary information and control flows for work unit page fault processing in the virtualization system of FIG. 3 with sequestered processor cores configured as de facto accelerators consistent with at least one embodiment of the invention.

While processing a work unit, a sequestered core 406 configured as a de facto accelerator may experience a page fault (i.e., sequestered core 406 accesses a page that is mapped in address space but is not loaded into physical memory). Referring to FIGS. 3, 4, and 7, in at least one embodiment of computing system 400, those page faults experienced by sequestered core 406 are recognized by VMM 402 and a world switch occurs to VMM 402 (702). Virtual machine monitor 402 obtains page fault information from the sequestered core and creates a kernel-level page fault entry, which VMM 402 pushes onto user fault queue 422 (704). Virtual machine monitor 402 issues a fault queue interrupt via a local APIC to one of host cores 404 (706). Kernel mode driver 410 interrupt handler processes the interrupt and executes a fault queue deferred procedure call and reads the fault off of system fault queue 428. Kernel mode driver 410 updates the page tables associated with the user process (710) and generates a command (e.g., CMD_RESUME including a field for a target core) for resuming execution by the sequestered core 406 configured as a de facto accelerator (712). Kernel mode driver 410 pushes that command into command queue 418 (712) and rings a doorbell of VMM 402 (e.g., VMMCALL) that indicates that command queue 418 has a new entry (714). Virtual machine monitor 402 processes the VMMCALL on host core 404 and issues an inter-processor interrupt (i.e., INIT IPI) to a sequestered core 406 that includes queue handler 412 (i.e., de facto accelerator core 0), which processes command queue 418. In response to the inter-processor interrupt, de facto accelerator core 0 reads command queue 418 and processes the command (e.g., CMD_RESUME) (716), e.g., by sending an inter-processor interrupt to an appropriate sequestered core 406 to resume processing the work unit (718). Virtual machine monitor 402 then processes a VMEXIT (e.g., performs a world switch) and the sequestered core 406 resumes processing the work unit (720).

Figure 8:
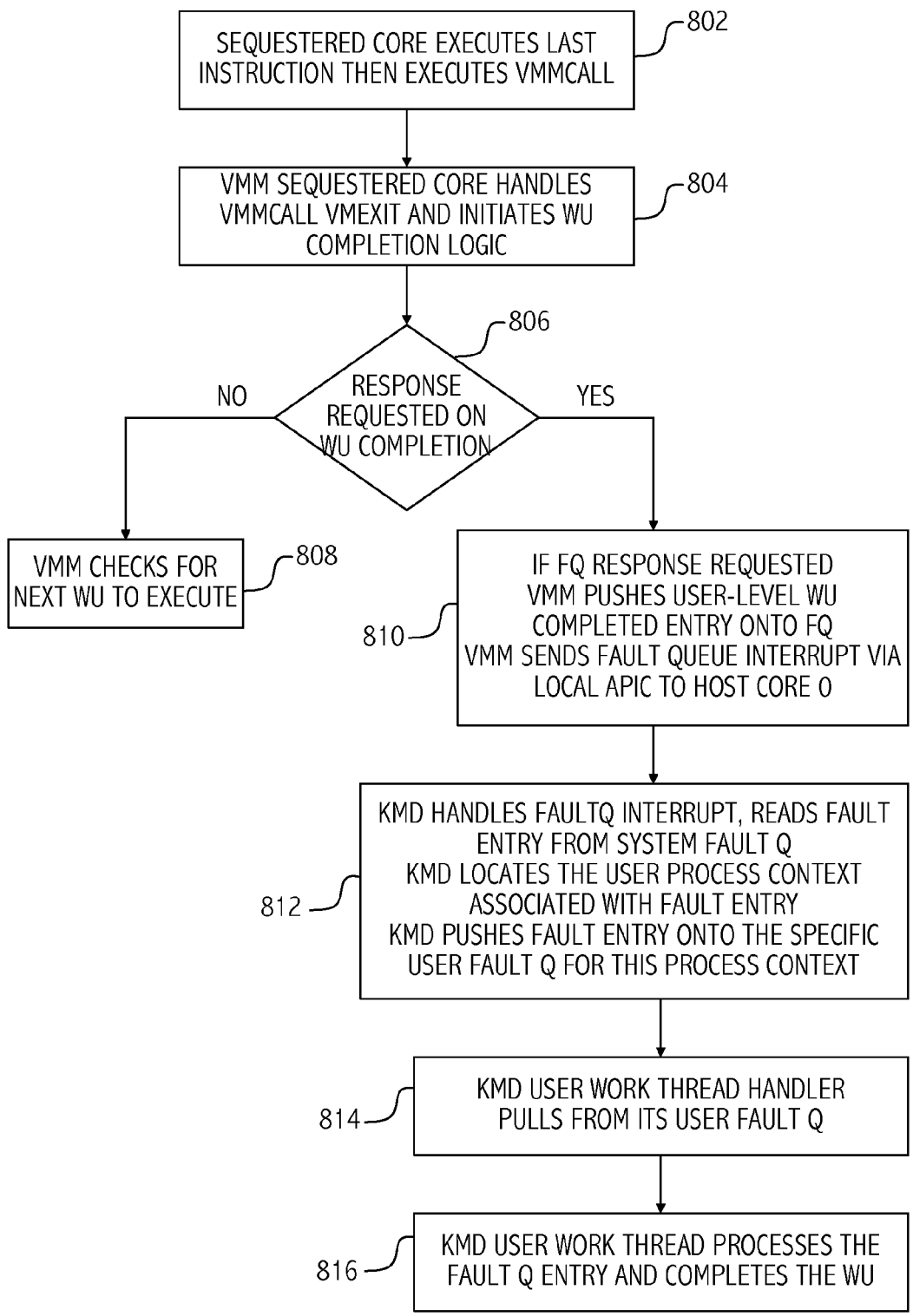
FIG. 8 illustrates exemplary information and control flows for work unit command completion in the virtualization system of FIG. 3 with sequestered processor cores configured as de facto accelerators consistent with at least one embodiment of the invention.

Referring to FIGS. 3, 4, and 8, in at least one embodiment of computing system 400, once a work unit has been processed and the sequestered core 406 executes a last instruction for the work unit, the sequestered core 406 executes a routine that includes one or more instructions that indicate the work unit has completed execution (e.g., VMMCALL) (802). Accordingly, sequestered core 406 returns to execution of VMM 402, and VMM 402 processes the indicator of work unit completion (804). In at least one embodiment of computing system 400, VMM 402 determines whether it is configured to issue a notification of work unit completion (808). If VMM is not configured to issue a notification, VMM 402 will proceed to process a next work unit (810). Alternatively, VMM will issue a completion directive. In at least one embodiment, VMM 402 pushes a work unit completion entry into system fault queue 428 and VMM 402 sends a fault queue interrupt (e.g., via local APIC) to an operating system core 404 (812).

Kernel mode driver 410 processes the fault queue interrupt and reads an entry from system fault queue. Kernel mode driver 410 locates the user process context associated with the fault entry and pushes the fault entry into a particular user fault queue 422 for the process context (814). A user work thread handler in kernel mode driver 410 pulls a fault entry from user fault queue 422 and completes the work unit (818).

Figure 9:
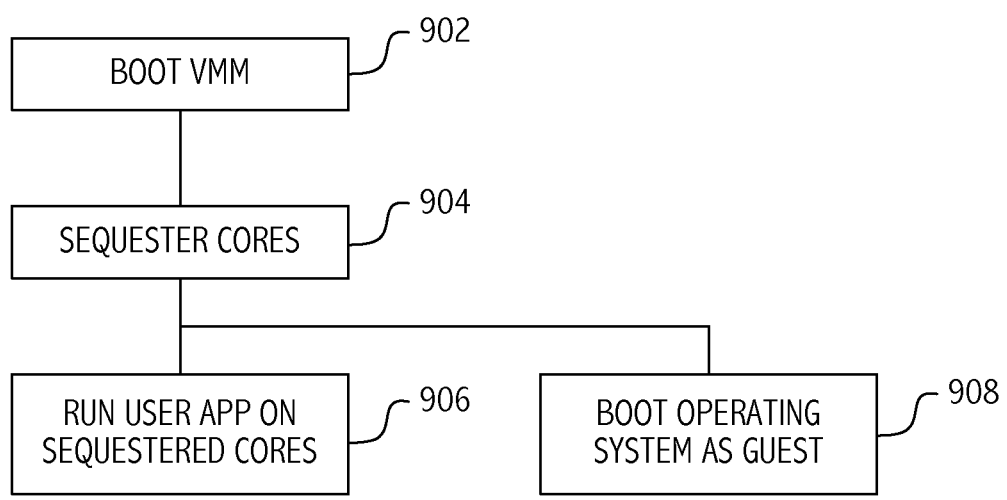
FIG. 9 illustrates information and control flows in the virtualization system of FIG. 3 configured for instant-on application usage consistent with at least one embodiment of the invention.

Referring to FIG. 9, in at least one embodiment of computing system 400, sequestered cores 406 are configured for instant-on application usage, rather than as de facto accelerators. Upon a system reset, VMM 402 boots on the cores of system 400 (e.g., host cores 404 and sequestered cores 406) (902). For example, VMM 402 may reside in the BIOS and automatically sequesters cores 406 from cores 402 (904).

Virtual machine monitor 402 is configured to have access to the file system and runs a user application on one or more of sequestered cores 406 (906). Meanwhile, VMM 402 boots operating system 408 as a guest on host cores 404 (906). Virtual machine monitor 402 includes one or more drivers or basic input output system (i.e., BIOS interface) functions to access media containing an application that will initially run on sequestered cores 406.

Although VMM 402 is described as a virtual machine monitor in general, in at least one embodiment, VMM 402 is a minimalistic implementation of a virtual machine monitor that is configured to provide the functionality described herein, and few other virtualization functions. In another embodiment, the functionality of VMM 402 described herein is incorporated into a general virtual machine monitor that provides other typical virtual machine functions. In at least one embodiment of computing system 400, virtual machine monitors may be nested, e.g., operating system 408 is a VMM machine monitor that is controlled by VMM 402 consistent with the functionality described herein. In at least one embodiment of computing system 400, use of virtualization techniques to sequester cores requires no modification to the operating system.

The description of the invention set forth herein is illustrative, and is not intended to limit the scope of the invention as set forth in the following claims. For example, while the invention has been described in an embodiment in which sequestered cores are configured as de facto accelerators for an application execution on a guest operating system under control of a VMM, one of skill in the art will appreciate that the teachings herein can be utilized for instant-on applications, network device acceleration, and general computational acceleration. For example, VMM 402 may coordinate with a network router device to accelerate packet inspection functions using sequestered cores 406. In addition, although the invention has been described in a computing system in general, embodiments of the teachings described herein may be included in servers, desktop systems (e.g., personal computers), embedded applications (e.g., mobile communications devices) and other suitable applications. Variations and modifications of the embodiments disclosed herein may be made based on the description set forth herein, without departing from the scope and spirit of the invention as set forth in the following claims.

What is claimed is:

1. A method comprising:
   executing a virtual machine monitor on a computer system including a plurality of cores;
   selecting one or more cores of the plurality of cores as a first subset of cores;
   executing an operating system on the first subset of cores, wherein the operating system executes as a guest under control of the virtual machine monitor and an application executes using the operating system;
   sequestering from the operating system, as one or more computing accelerators, a second subset of cores of the plurality of cores, the first and second subsets of cores being mutually exclusive, wherein the virtual machine monitor provides an interface to the first subset of cores and the second subset of cores;
   scheduling work for the application to be completed by the second subset of cores;
   causing a core of the second subset of cores to exit to the virtual machine monitor in response to an inter-processor interrupt caused by a core of the first subset of cores; and
   executing the work for the application on the second subset of cores, the second subset of cores not being visible to the operating system, and the application indirectly accessing the second subset of cores using the virtual machine monitor.

2. The method of claim 1, wherein the sequestering includes dedicating a portion of shared system memory to the second subset of cores.

3. The method of claim 1, further comprising:
   providing information regarding available computing accelerators to a driver executing on the operating system.

4. The method of claim 1, further comprising:
   scheduling work to be completed by a target accelerator of the one or more computing accelerators.

5. The method of claim 1, wherein the executing comprises:
   requesting work to be completed for the benefit of the application by the computing accelerators;
   indicating to the operating system completed work; and
   handling page faults generated by a work item.

6. The method of claim 1, further comprising:
   accessing, by the second subset of cores, an application program interface provided by the operating system.

7. The method of claim 6, wherein the application program interface is one of an operating system memory allocation routine and an exception handling routine.

8. The method of claim 1, wherein the virtual machine monitor executes on the first subset of cores and the second subset of cores.

9. The method of claim 1, wherein the first subset includes fewer than a maximum number of cores the operating system is able to utilize.

10. The method of claim 1, wherein the sequestering comprises modifying BIOS tables to sequester the second set of cores.

11. The method of claim 1, wherein the selecting comprises intercepting an operating system command to configure a number of cores in the first subset of cores.

12. An apparatus comprising:
    a plurality of cores;
    operating system software encoded in one or more media accessible to the plurality of cores;
    application software encoded in one or more media accessible to the plurality of cores;
    hypervisor software encoded in one or more media accessible to the plurality of cores and executable on one or more of the plurality of cores, wherein the hypervisor software is executable to select a first set of cores and a second set of cores from the plurality of cores and executable to control execution of the operating system software as a guest on the first set of cores, the operating system software being configured to execute the application software, and wherein at least some work of the application software is executed on the second set of cores, wherein the second set of cores is not visible to the operating system and the first and second sets of cores are mutually exclusive, wherein the hypervisor software provides an interface to the first set of cores and the second set of cores, and is executable to cause a core of the second set of cores to exit to the hypervisor in response to an inter-processor interrupt caused by a core of the first set of cores; and
    a computing driver encoded in one or more media accessible to the first set of cores, wherein the computing driver executes on the operating system and interacts with the hypervisor to schedule work of the application to the second set of cores.

13. The apparatus of claim 12, wherein the hypervisor software includes code executable on the plurality of cores to isolate the second set of cores from the operating system.

14. The apparatus of claim 12, further comprising: a shared system memory shared by the plurality of cores.

15. The apparatus of claim 12,
wherein the application software and the computing driver are configured to generate at least one queue for communicating between the application and the second set of cores.

16. The apparatus of claim 15, wherein the at least one queue includes:
a command queue configured to communicate from a computing driver to the hypervisor;
a response queue configured to communicate from the hypervisor to the computing driver;
a fault queue configured to communicate from the hypervisor to the computing driver; and
a work queue configured to communicate from a computing application program interface to the hypervisor.

17. The apparatus of claim 12, further comprising:
a computing application program interface encoded in one or more media accessible to the first set of cores.

18. The apparatus of claim 12, further comprising:
application software encoded in one or more media accessible to the plurality of cores executable on the operating system, wherein the hypervisor software includes code executable to configure the second set of cores as computing accelerators and code to execute work for the application software on the second set of cores.

19. A computer program product comprising:
a non-transitory computer-storage medium configured to store one or more functional sequences executable as, or in conjunction with, a virtual machine monitor and configured to select one or more cores of a plurality of cores of a computer system as a first set of cores, configured to execute an operating system sequence as a guest under control of the virtual machine monitor on the first set of cores, configured to sequester as one or more computing accelerators, a second set of cores of the plurality of cores, the first and second sets of cores being mutually exclusive, configured to execute an application sequence on the operating system, configured to schedule at least some work of the application sequence to the second set of cores, and configured to execute the at least some work of the application sequence on the second set of cores, wherein the second set of cores is not visible to the operating system, and configured to cause a core of the second set of cores to exit to the virtual machine monitor in response to an inter-processor interrupt caused by a core of the first set of cores, wherein the virtual machine monitor is configured to provide an interface to the first set of cores and the second set of cores.

20. The computer program product of claim 19, wherein the one or more functional sequences configure the second set of cores as computing accelerators for executing application code work on the second set of cores.

21. The computer program product of claim 19, wherein the computer program product is encoded in at least one computer readable medium selected from the set of a disk, tape, or other non-transitory storage medium.

* * * * *